(12) United States Patent
Georges

(10) Patent No.: US 8,066,463 B2
(45) Date of Patent: Nov. 29, 2011

(54) SLEEVE PROTECTED FASTENER

(75) Inventor: William D. Georges, Gallatin, TN (US)

(73) Assignee: Simpson Strong-Tie Company, Inc., Pleasanton, CA (US)

( * ) Notice: Subject to any disclaimer, the term of this patent is extended or adjusted under 35 U.S.C. 154(b) by 612 days.

(21) Appl. No.: 12/052,636

(22) Filed: Mar. 20, 2008

(65) Prior Publication Data

US 2008/0232928 A1   Sep. 25, 2008

Related U.S. Application Data

(60) Provisional application No. 60/896,155, filed on Mar. 21, 2007.

(51) Int. Cl.
*F16B 19/14* (2006.01)
(52) U.S. Cl. ....................................................... 411/441
(58) Field of Classification Search .................. 411/440, 411/441
See application file for complete search history.

(56) References Cited

U.S. PATENT DOCUMENTS

| | | | | |
|---|---|---|---|---|
| 3,490,329 A * | 1/1970 | Pratorius | ........................ | 411/441 |
| 3,841,474 A * | 10/1974 | Maier | ............................ | 206/346 |
| 4,028,986 A * | 6/1977 | Beton | ............................ | 411/440 |
| 6,352,398 B1 * | 3/2002 | Gonnet | ............................ | 411/441 |
| 6,688,829 B1 * | 2/2004 | Popovich et al. | ............. | 411/441 |
| 6,824,342 B2 * | 11/2004 | Gassmann et al. | ............ | 411/441 |
| 7,182,565 B2 * | 2/2007 | Buytaert et al. | ............. | 411/441 |
| 7,794,190 B2 * | 9/2010 | Gauthier et al. | ............. | 411/441 |
| 2007/0053768 A1 * | 3/2007 | Durig | ............................ | 411/441 |

* cited by examiner

*Primary Examiner* — Flemming Saether
(74) *Attorney, Agent, or Firm* — Vierra Magen Marcus & DeNiro LLP

(57) ABSTRACT

A fastener system for use with a powder actuated tool. The system include a pin, a metallic washer surrounding a portion of the pin at the second end; and a plastic sleeve disposed between the metallic washer and the pin. The plastic sleeve includes a cap portion and an sleeve portion, the cap portion disposed on the top side of the metallic washer coincident with the head of the pin.

13 Claims, 2 Drawing Sheets

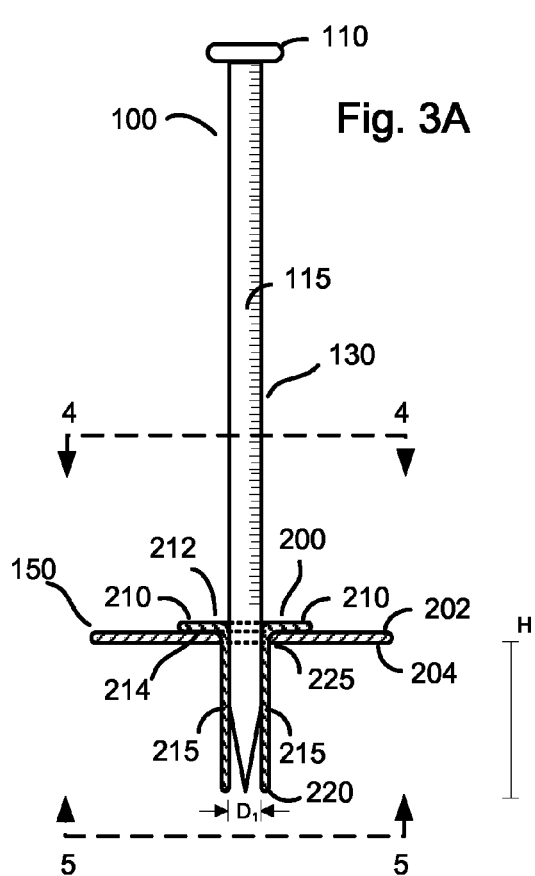
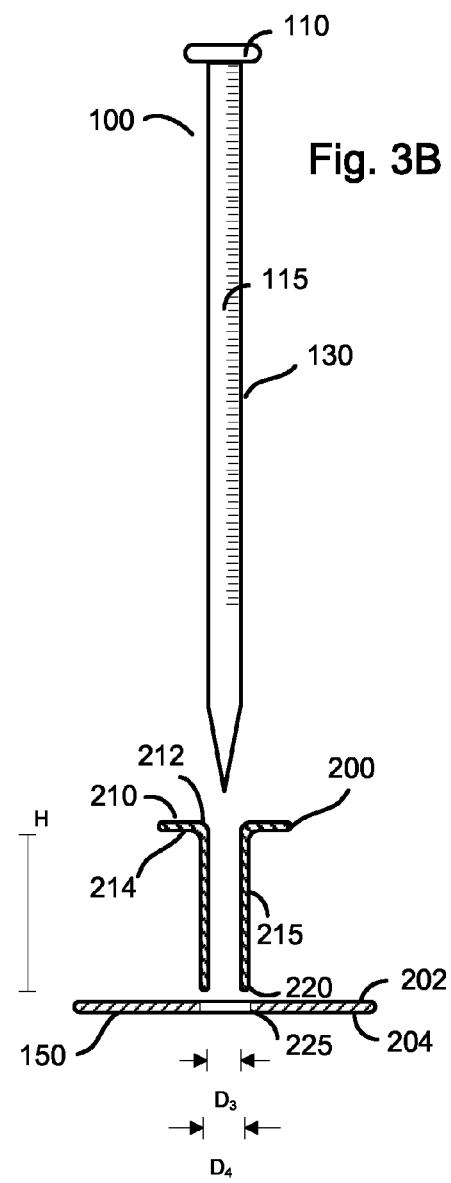
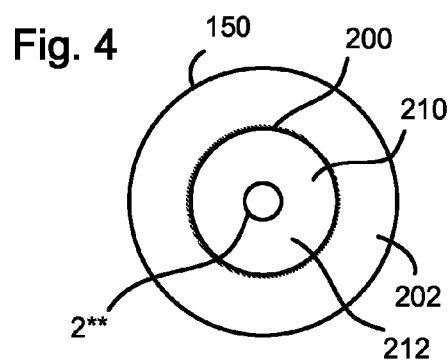
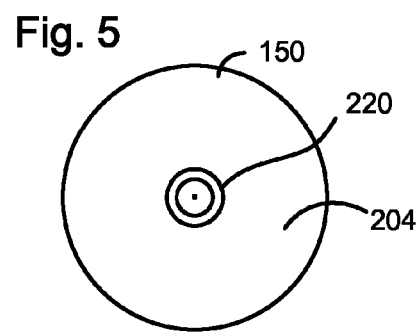

SLEEVE PROTECTED FASTENER

PRIORITY CLAIM

This application claims the benefit of U.S. Provisional Application No. 60/896,155, filed on Mar. 21, 2007, entitled "Sleeve Protected Fastener," having inventor William D. Georges.

BACKGROUND

Pressure-treated wood is truly a rugged exterior building product that is rot and insect resistant. Treated wood is used for a number of exterior building applications. Pressure treatment is a process that forces chemical preservatives into the wood. Wood is placed inside a closed cylinder, and vacuum and pressure are applied to force the preservatives into the wood. The preservatives help protect the wood from attack by termites, other insects, and fungal decay.

Hot-dip galvanized or stainless steel fasteners, anchors and hardware are recommended by the Pressure Treated Wood Industry for use with treated wood. This prevents the fasteners from decaying faster than the wood itself. In the past this industry did not address the required levels of galvanizing, however most of those in the industry now provide information regarding the minimum level of galvanizing that should be used.

In general, the thicker the galvanized coating the longer the expected service life of the fastener, connector, anchor, or other hardware will be. Mechanical galvanizing is a process of providing a protective coating (zinc) over bare steel. The bare steel is cleaned and loaded into a tumbler containing non-metallic impact beads and zinc powder. As the tumbler is spun, the zinc powder mechanically adheres to the parts. The zinc coating has "good" durability, but has less abrasion resistance than hot-dip galvanized zinc coatings since it does not metalurgically bond with the steel. Some anchors and fasteners can be mechanically galvanized.

An alternative to mechanical galvanizing is hot-dip galvanizing Hot-dip galvanizing is the process of coating iron or steel with a thin zinc layer, by passing the steel through a molten bath of zinc at a temperature of around 460° C. In general, a heavier/thicker coating would be expected to have a longer service life than standard galvanized connectors.

Typically, pin and washer combinations are used as fastener systems in powder actuated fastening devices. Commonly known as Powder Actuated Tools, these devices force a pin through a washer into the wood with sufficient force to embed the pin in a single stroke. Typically, a fastener is initially coupled to a metallic washer with a through-hole having a diameter smaller than the diameter of a fastener. This ensures that the pin and washer stay in place when loaded in to the fastening device, and are secure when the device is forced downward (toward the wood), typically to deactivate a safety device present in the tool which prevents accidental firing of the fastener. When used with standard applications of washers having a through-hole with a diameter smaller than the diameter of a fastener, the washer can scratch off a galvanized coating, eliminating or reducing the benefits of the zinc layer.

SUMMARY

In one embodiment, a fastener system for use with a powder actuated tool includes a fastener including a shaft having a first end including a head and second end including a point. A metallic washer surrounds a portion of the fastener at the second end; and a plastic sleeve is disposed between the metallic washer and a shaft of the fastener. The plastic sleeve includes a cap portion and a sleeve portion, the cap portion exposed on the top side of the metallic washer, the sleeve extending through the washer.

In addition, a method of assembling a fastening system is disclosed. The method includes providing a fastener having a first end and a second end defining a length and providing a metallic washer having a bore. A plastic sleeve is inserted into the bore in the washer. The sleeve has an outer diameter sized to fit within the bore. Next, the fastener is inserted into the second end of the sleeve toward the first end.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3A is a plan view of the fastener of the present technology.

FIG. 3B is a second plan view of the fastener of FIG. 3A.

FIG. 4 is a view along line 44 in FIG. 3.

FIG. 5 is a view along line 55 in FIG. 3.

DETAILED DESCRIPTION

Figure 1:
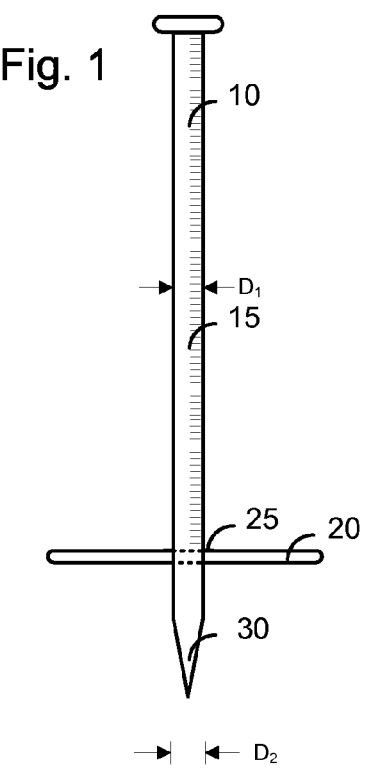
FIG. 1 is a plan view of a prior art fastener and washer combination.

FIG. 1 illustrates a prior art pin and washer combination. A pin 10 includes a shaft 15 and a point 30 and a diameter D1. Washer 20 includes a through hole 25 having a diameter D2 slightly smaller than diameter D1. The diameter D2 is designed so that the through hole 25 will engage shaft 15 after passing over point 30 to establish a friction fit between the washer 20 and shaft 15 allowing both the pin 10 and washer 20 to be loaded into a powder actuated tool. With thinner zinc coatings, the difference in diameters D2 and D1 was not significant enough to remove the coating from the pin 10. However, with thicker coatings, this type of fastener results in coating being scrapped off of the shaft 15 as a washer slides up the shaft. This can compromise the integrity of the fastener and cause the fastener to fail.

Figure 2:
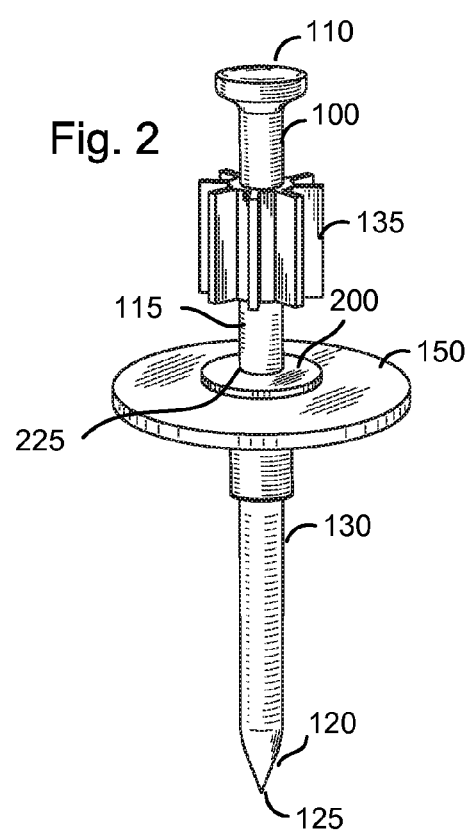
FIG. 2 is a perspective view of a fastener provided in accordance with the present technology.

FIGS. 2-5 illustrate a fastener system 100 created in accordance with the present technology. Fastener 100 includes a pin 130 having a shaft 115 and head 110. Head 110 is provided at a first end of shaft 115 and a tip 125 is provided at a second end 120 of shaft 115. Illustrated in FIG. 2 is a washer 150 having a through hole 225 through which a sleeve 200 made of a plastic material is provided. As illustrated in FIGS. 3A and 3B, sleeve 200 includes a shaft 215 extending a length H and a cap portion 210 having a top surface 212 and bottom surface 214. Washer 150 includes a top surface 202 and a bottom surface 204. The bottom surface 214 of sleeve 200 abuts the top surface 202 of washer 150. Shaft 215 of sleeve 200 has an inner diameter D3 sized to surround fastener shaft 115 and further includes an outer diameter D4 sized to match the inner diameter of through hole 225. Also shown in FIG. 2 is an adapter 135 commonly used on pre-assembled fasteners to align the fastener in the barrel of the tool.

In one embodiment, the parts are arranged as shown in FIG. 3B and the shaft 215 of sleeve 200 is first inserted through hole 225 in washer 150 until top surface 202 engages bottom surface 214 of the cap portion of sleeve 200. Subsequently, the pin 100 is forced through the shaft from the cap portion to a position shown in FIG. 3A. The diameter D1 of the shaft 115 is somewhat larger than D3, inducing a friction fit between the through hole 225 and the shaft 215 positioned there through. This friction fit prevents movement of the washer 150 relative to the sleeve 200.

FIG. 3A illustrates an initial fastener position ready for insertion into a powder actuated tool. FIG. 2 illustrates an extended fastener position with the pin extending through the sleeve, the sleeve 200 having slid up the shaft 115 to the position shown in FIG. 2. Sleeve 200 is comprised of plastic such that when a pin is extruded through the sleeve to the position shown in FIG. 2, no flaking of the coating on the pin occurs.

The fastener 100 is advantageously used with powder actuated tools. These tools may require a downward pressure be exerted by the operator against a loaded fastener positioned in the tool, with the fastener positioned against the surface into which it is to be inserted, in order to release a firing safety. Normally, with the fastener shown in FIG. 1, the force is exerted against the washer 20. This is because the washer 20 is at or nearly adjacent to this surface in which the fastener is to be inserted.

In the fastener of FIGS. 2-5, force is exerted against the cap of sleeve 200. In one embodiment, the length H of sleeve 215 is sized to adapt to the type of tool in which the fastener is being used. The sleeve allows pins of various sizes to be adapted to fit various powder actuated tools. For example, if a powder actuated tool is sized to fire two and one-half inch pins, the half inch length H of the sleeve can be utilized to effectively shorten the length of a three inch sleeve allowing the three inch fastener to be used in the two and a half inch tool. It would be readily recognized that all dimensions discussed herein, including the length H and diameters D1, D2 and D3 can all be adjusted accordingly.

Typically, fastener systems of the present design may be manufactured from mechanically galvanized carbon steel or stainless steel to have a galvanized coating thickness of 1.4-3.9 milli-inches, with shank lengths varying from 2-3", and shank diameters (D2) of 0.145-0.177 inch. mechanically galvanized carbon steel or stainless steel. Washer 150 may have a diameter of about 1", but its size may vary as well.

Coatings applied to the fastener may be any of a number of commercially available coatings. Mechanical galvanization provides a protective zinc and tin coating over base metal. The coating is applied by mechanically tumbling zinc and tin powder with base metal and non-metallic impact beads. Still further, a coating system that combines a mechanically plated zinc undercoat with a thermosetting polyester top coat applied in multiple layers using dip-spin technology may be used. Mechanical galvanization coatings provide a protective zinc nickel alloy coating over base metal. The coating is applied by mechanically tumbling base metal with non-metallic impact beads and zinc powder. Alternatively, a duplex coating system which combines an electroplated zinc and chromate substrate with an organic top coat may be used. An electroplated zinc layer provides sacrificial protection of the steel substrate while the topcoat creates a durable barrier. Typical coating thickness is 8-10 microns top coat over 8 microns minimum zinc/chromate base coat.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A fastener system for use with a powder actuated tool, comprising:
    a fastener including a shaft having a first end including a head and second end including a point;
    a metallic washer surrounding a portion of the fastener at the second end, and a top surface and a bottom surface; and
    a plastic sleeve having a first end and a second end, the plastic sleeve disposed between the metallic washer and the shaft of the fastener, the plastic sleeve having a cap portion and an sleeve portion, the cap portion being generally flat, having a top surface and a bottom surface at the first end and being exposed on the top surface of the metallic washer, the sleeve portion having the shape of a cylinder coupled to the cap portion at the first end and having an constant outer diameter between the cap portion and the second end, the sleeve extending through the washer, the bottom surface of the cap portion at the first end abutting the top surface of the metallic washer.

2. The fastener system of claim 1 wherein the sleeve has an interior diameter, the fastener has a diameter, and the interior diameter is less than the diameter of the fastener.

3. The fastener system of claim 1 wherein the fastener has a length, and the sleeve has a length which is a fraction of the length of the fastener.

4. The fastener system of claim 3 wherein the length of the sleeve adapts the fastener shaft to an design length of a powder actuated fastener.

5. The fastener system of claim 1 wherein the fastener has a galvanized coating.

6. The fastener system of claim 5 wherein the coating has a thickness of about 1 to 20 microns.

7. The fastener system of claim 1 wherein the diameter of the shaft is larger than that of the inner diameter of the plastic sleeve.

8. A fastener system for use with a powder actuated tool, comprising:
    a pin including a shaft having a first end including a head and second end including a point, wherein the shaft has a diameter;
    a metallic washer adapted to surround a portion of the pin at the second end, the washer having a top side and a bottom side; and
    a plastic sleeve having a first end and a second end, the plastic sleeve having a generally flat portion disposed between the metallic, washer and the pin, the plastic sleeve having a cap portion and an sleeve portion, the cap portion adapted to be disposed on the top side of the metallic washer coincident with the head of the pin, the sleeve extending through the washer to the point of the pin;
    the plastic sleeve has an inner diameter and an outer diameter, the diameter of the shaft being larger than that of the inner diameter of the plastic sleeve, the metallic washer includes a through hole having a diameter and the outer diameter of the sleeve is sized to match the diameter of the through hole;
    wherein the diameter of the shaft induces a friction fit between the through hole of the washer and the sleeve portion positioned there through which prevents movement of the washer relative to the sleeve.

9. The fastener system of claim 8 wherein the fastener has a length, and the sleeve has a length which is a fraction of the length of the fastener.

10. The fastener system of claim 9 wherein the length of the sleeve adapts the fastener shaft to an design length of a powder actuated fastener.

11. The fastener system of claim 10 wherein the fastener has a galvanized coating.

12. The fastener system of claim 11 wherein the coating has a thickness of about 1 to 20 microns.

13. The fastener system of claim 8 wherein the sleeve has an outer diameter (d4), the outer diameter being constant along a length of the sleeve.

\* \* \* \* \*